(12) United States Patent
Romesburg

(10) Patent No.: US 12,714,164 B1
(45) Date of Patent: Aug. 25, 2026

(54) CLOTHING PROTECTION SYSTEM

(71) Applicant: Daniel R. Romesburg, Lutz, FL (US)

(72) Inventor: Daniel R. Romesburg, Lutz, FL (US)

( * ) Notice: Subject to any disclaimer, the term of this patent is extended or adjusted under 35 U.S.C. 154(b) by 0 days.

(21) Appl. No.: 19/285,337

(22) Filed: Jul. 30, 2025

(51) Int. Cl.
*A41D 13/04* (2006.01)
*A41B 13/10* (2006.01)
*B60R 11/00* (2006.01)

(52) U.S. Cl.
CPC ............ *A41D 13/04* (2013.01); *A41B 13/103* (2013.01); *B60R 11/00* (2013.01); *B60R 2011/0031* (2013.01)

(58) Field of Classification Search
CPC .... A41D 13/04; A41B 13/103; A41B 13/106; A41B 13/10; B60R 11/00; B60R 2011/0031; B60R 2011/007
See application file for complete search history.

(56) References Cited

U.S. PATENT DOCUMENTS 2,319,292 A * 5/1943 Boggs ..................... A41F 1/002 2/96
4,170,991 A 10/1979 Kella
4,946,094 A * 8/1990 Stang ..................... B65D 25/10 2/48
5,181,275 A 1/1993 Spulgis
5,220,692 A 6/1993 Cox
5,429,418 A * 7/1995 Lipper .................. B60R 22/105 297/483
5,604,960 A * 2/1997 Good ...................... A41F 1/002 24/66.1
5,621,916 A 4/1997 Bell
5,668,869 A * 9/1997 Zinno ..................... H04M 1/05 379/454
5,701,605 A * 12/1997 Bowen .............. A47G 23/0608 2/48
5,956,763 A 9/1999 Blackshear
6,017,094 A * 1/2000 Syiek ..................... B60N 2/882 297/DIG. 6
6,484,333 B1 * 11/2002 Hill ...................... B60N 2/6009 2/49.4
6,557,895 B2 * 5/2003 Haack ..................... B60R 22/00 280/751
6,783,185 B1 * 8/2004 Sutton .................... A41B 13/10 280/801.1
6,826,780 B1 12/2004 Romesburg
6,925,687 B1 * 8/2005 Overton .................... A45F 5/02 24/543
7,178,185 B1 * 2/2007 Nattler ................... A41D 15/04 2/84
D572,901 S * 7/2008 St. George ..................... D2/639
(Continued)

*Primary Examiner* — Alissa L Hoey
(74) *Attorney, Agent, or Firm* — GrayRobinson, P.A.

(57) ABSTRACT

Disclosed is a clothing protection system that is adapted for use within a motor vehicle. The vehicle includes a passenger restraint with lap and shoulder belts. The system includes a bib including a panel and receptable. A magnet is embedded in the back of the panel. A clip includes a metallic backing plate and two opposing C-shaped arms. The arms are attached to the clip and form a channel. The metallic backing plate can be magnetically secured to the bib and the shoulder belt can be threaded between the opposing C-shaped arms. This allows the bib to be slidably positioned anywhere along the length of the shoulder belt.

3 Claims, 4 Drawing Sheets

(56) References Cited

U.S. PATENT DOCUMENTS

| | | | | |
|---|---|---|---|---|
| 7,451,494 | B2 * | 11/2008 | Monroe | A41B 13/10 2/49.1 |
| 7,512,993 | B1 * | 4/2009 | Gutierrez | A41B 13/10 2/49.1 |
| 8,068,888 | B2 * | 11/2011 | Ross, III | A45F 5/02 455/575.8 |
| 8,818,465 | B1 * | 8/2014 | Gorham, Jr. | H04B 1/3888 455/90.3 |
| 9,814,277 | B2 * | 11/2017 | Lee | A47G 21/165 |
| 9,819,377 | B1 * | 11/2017 | Singh | H04B 1/3877 |
| 10,231,490 | B2 * | 3/2019 | Bisson | A41B 13/103 |
| 10,342,296 | B2 * | 7/2019 | Unger | B60N 2/2816 |
| 11,242,012 | B1 * | 2/2022 | Bell | B60R 11/0241 |
| D950,891 | S * | 5/2022 | Khachikyan | D2/860 |
| 11,641,887 | B2 * | 5/2023 | D'Amato-Friedman | A41B 13/103 2/49.2 |
| 12,419,362 | B2 * | 9/2025 | Wu | A41B 13/103 |
| 2008/0289075 | A1 * | 11/2008 | Ward, Jr. | A41B 13/10 2/48 |
| 2011/0023761 | A1 * | 2/2011 | Ekelund | A41B 13/10 112/475.09 |
| 2011/0132950 | A1 * | 6/2011 | Culver | B60R 11/0241 224/485 |
| 2016/0227850 | A1 * | 8/2016 | Doumas | A41B 13/10 |
| 2019/0133204 | A1 * | 5/2019 | Martone Cardinale | B32B 7/12 |
| 2022/0117320 | A1 * | 4/2022 | Lee | A41B 13/10 |
| 2023/0404174 | A1 * | 12/2023 | Wu | B32B 7/12 |

* cited by examiner

CLOTHING PROTECTION SYSTEM

TECHNICAL FIELD

The present disclosure relates to a clothing protection system and more particularly pertains to preventing food and other items from being spilt on the clothing of a user while in a vehicle.

BACKGROUND OF THE INVENTION

The background art contains a wide variety of clothing protectors, such as bibs and aprons. These devices can help protect clothing from food and drink by conventional methods. The background art also illustrates how these bibs and aprons can be worn by drivers when operating a motor vehicle. However, the bibs and aprons of the background art largely consist of familiar, expected, and obvious structural configurations.

By way of example, U.S. Pat. No. 5,621,916 to Bell discloses a bib adapted to be worn while an operator is controlling a vehicle. Furthermore, U.S. Pat. No. 5,956,763 to Blackshear discloses a bib for use by motor vehicle occupants and generally comprises a torso panel adapted to cover a person's torso, a pocket portion which folds out from the torso panel to catch spilled food and beverages, and a wire reinforced tab formed in an upper portion of the torso panel for securing the bib to a person's shirt collar. Additionally, U.S. Pat. No. 5,220,692 to Cox discloses a driver's apron that may be worn by the driver of a vehicle and which protects clothing from spilled food or beverages while eating and driving. U.S. Pat. No. 5,181,275 to Spulgis discloses an apron to be used in a seated position, the apron is placed in a lap of a seated wearer to protect the legs and lower torso of the wearer, and the seating surface on which the wearer is seated. U.S. Pat. No. 4,170,991 to Kella discloses an accessory for a wheelchair for use by a patient seated therein and essentially a bib having a panel covering the chest and abdomen, a panel upon which the patient sits and a reduced crotch panel joining the other panels. Lastly, U.S. Pat. No. 6,826,780 to Romesburg, who is the inventor of the subject application, discloses a foldable clothing protection system for use upon a seatbelt.

While the background art fulfills unique and particular objectives, such art suffers from common drawbacks. For example, the background art fails to disclose a system that can easily be installed upon and removed from the seat belt of a vehicle, nor does the background art disclose a bib system that can be easily cleaned and wiped down after use. These and other shortcomings in the background art are addressed in the clothing protection system of the present disclosure.

Therefore, it can be appreciated that there exists a continuing need for a new and improved clothing protection system which can be used for preventing food and other items from being spilt on the clothing of a user while in a vehicle. In this regard, the present disclosure substantially fulfills this need.

SUMMARY OF THE INVENTION

This disclosure provides a bib that can be releasably attached to a vehicle restraint.

The disclosed system has several important advantages. For example, it allows a flexible, pliable bib to be magnetically secured to a vehicle shoulder belt.

A further possible advantage is the use of a pliable material for the bib, which allows it to be easily cleaned.

Still yet another possible advantage of the present system is to provide a clip that may reside permanently or semi-permanently upon a vehicle restraint that is used to secure a bib.

Another advantage of the present system is to provide a clip with a passage that can slidably receive a shoulder belt.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE DRAWINGS

The present disclosure relates to a clothing protection system that is adapted for use within a motor vehicle. The vehicle includes a passenger restraint with lap and shoulder belts. The system includes a bib including a panel and receptable. A magnet is embedded in the back of the panel. A clip includes a metallic backing plate and two opposing C-shaped arms. The arms are attached to the clip and form a channel. The metallic backing plate can be magnetically secured to the bib and the shoulder belt can be threaded between the opposing C-shaped arms. This allows the bib to be slidably positioned anywhere along the length of the shoulder belt. The various details of the present disclosure, and the manner in which they interrelate, are described in greater detail hereinafter.

Figure 1:
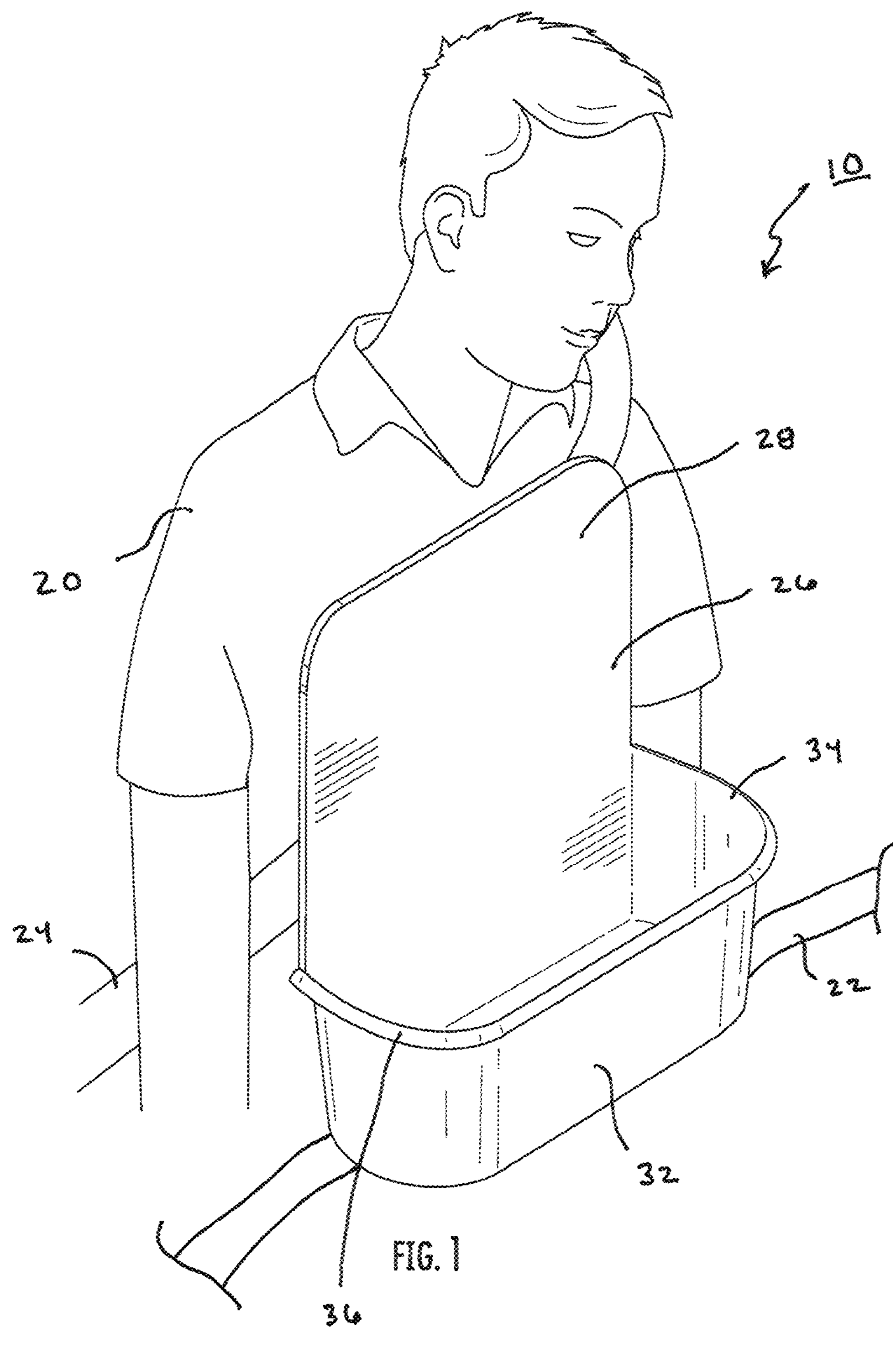
FIG. 1 is a perspective view of the clothing protection system of the present disclosure.
Figure 2:
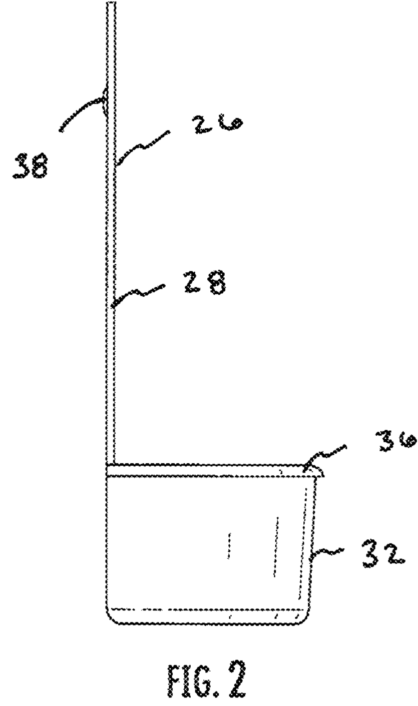
FIG. 2 is a side elevational view of the clothing protection system of the present disclosure.

With reference now to FIG. 1, the clothing protection system (10) is illustrated. As shown, system (10) is adapted for use by a user (20) within a motor vehicle, such as a car, boat, or plane. In such situations, user (20) will be restrained by a restraint system, which typically consists of a lap belt (22) and an interconnected shoulder belt (24). Shoulder belt (24) is defined by a width and an intermediate extent. As is known, when properly positioned, lap belt (22) extends over the lap of user (20), and the intermediate extent of the shoulder belt (24) extending across the chest of user (20).

Figure 5:
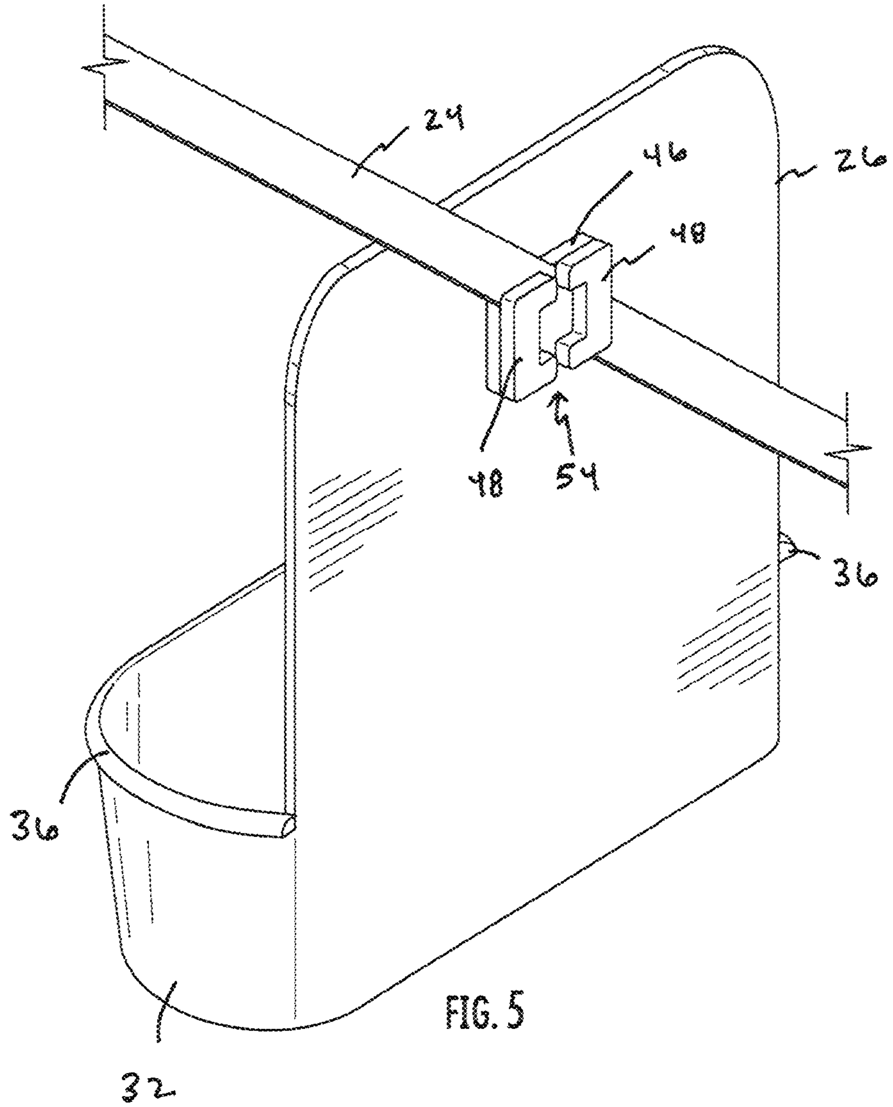
FIG. 5 is a perspective view of the clip magnetically connected to the back of the bib and with the shoulder belt positioned within the channel of the clip.
Figure 6:
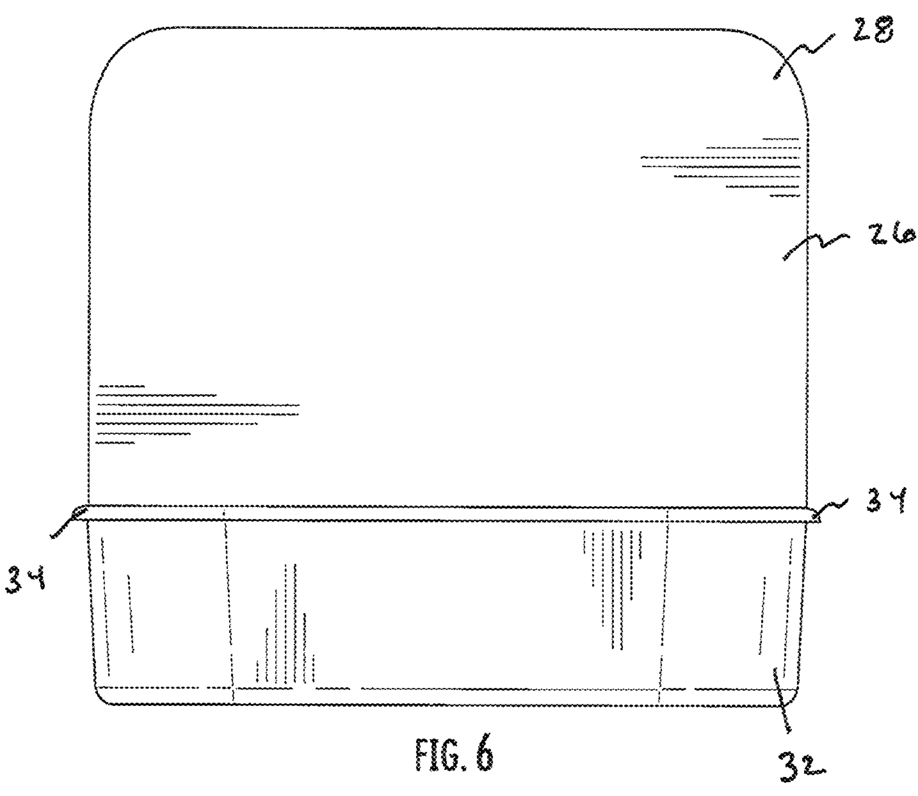
FIG. 6 is a front elevational view of the clothing protection system of the present disclosure.

System (10) includes a bib (26) that is preferably formed entirely from silicone. However, the use of other pliable polymer-based materials is also within the scope of the present disclosure. Bib (26) including a panel (28) having a height, a width, forward and rearward faces, and upper and lower extents. Bib (26) further including a receptacle (32) having a depth, a width, and an opened peripheral extent (34). Receptacle (32) is formed upon the forward face and lower extent of the panel (28). The width of panel (28) is generally equal to the width of receptable (32). An upstanding edge (36) is formed along the opened peripheral extent (34) of the receptacle (32). As noted by FIG. 5, the depth of the receptacle (32) is generally one third of the height of panel (28).

Figure 3:
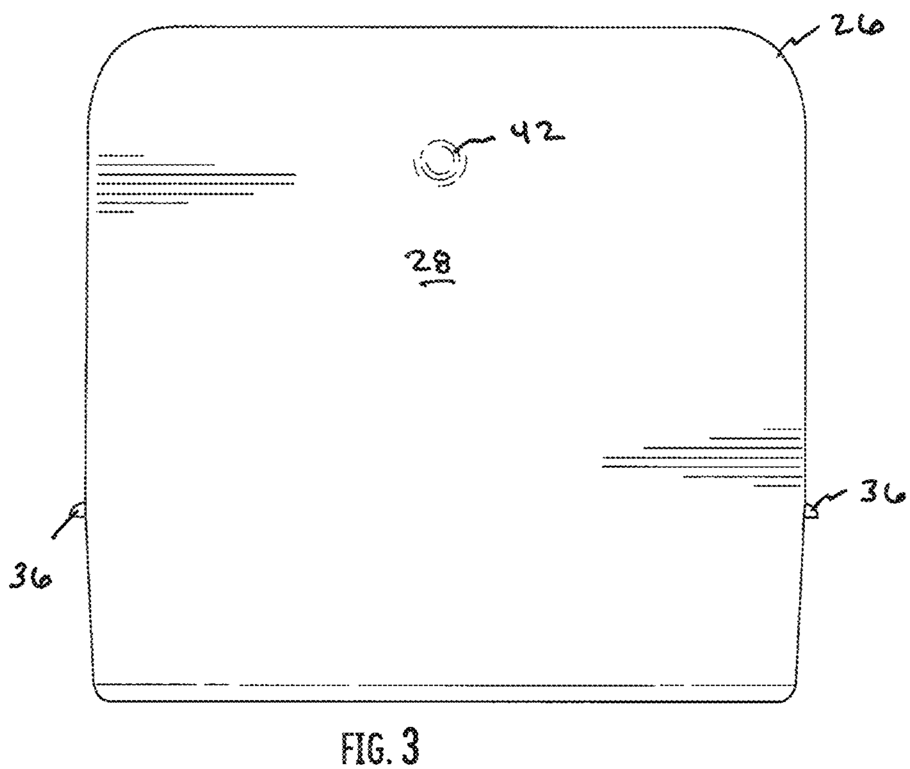
FIG. 3 is a rear elevational view of the clothing protection system of the present disclosure.

System (10) additionally includes a magnet (38) that is fully contained within bib (26). Magnet (38) is preferably positioned within the rearward face of panel (28) at the upper extent (FIG. 3). In this regard, magnet (38) forms a raised area (42) on the rearward face of panel (28).

Figure 4:
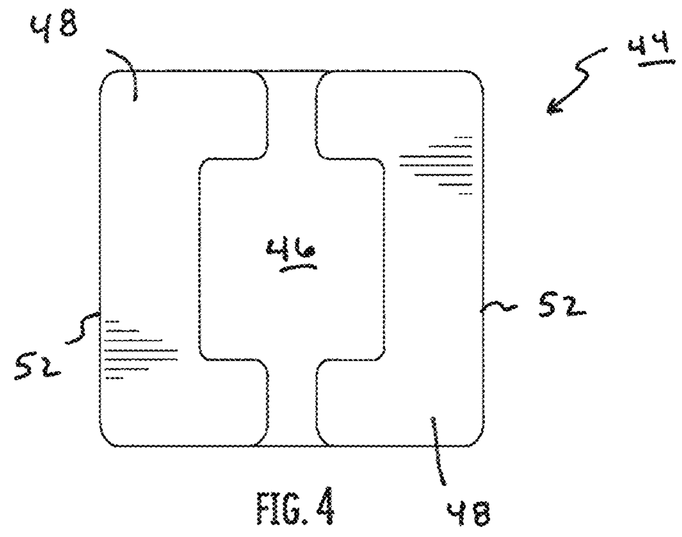
FIG. 4 is a detailed view of the clip used in the clothing protection system of the present disclosure.

The next component of system (10) is clip (44). As shown in FIG. 4, Clip (44) is preferably formed from a metallic backing plate (46) and two opposing resilient C-shaped arms (48). Each of the C-shaped arms (48) has a lateral edge (52) that is connected to backing plate (46). The C-shaped arms (48) are spaced at a distance above the backing plate (46) to form a channel (54) between backing plate (46) and opposing C-shaped arms (48). Channel (54) allows clip (44) to be slidably positioned upon the vehicle restraint. Namely, the width of shoulder belt (24) can be threaded into channel (54) by user (20). This, in turn, allows metallic backing plate (46) of clip (44) to be magnetically and removably secured to magnet (38) contained within bib (26) to thereby slidably position bib (26) upon the intermediate extent of the shoulder belt (24).

System (10) thereby provides an easy to use bib (26) for a user (20) within a vehicle. Clip (44) can be permanently or semi-permanently positioned upon shoulder belt (24). When user (20) wishes to each, such as after going through the drive through window of a restaurant, bib (26) can be magnetically attached to clip (44). Any foot or debris during eating will be collected within receptable (22). Given that bib (26) is formed from a pliant silicone material, it can be wiped down after use.

Figure 7:
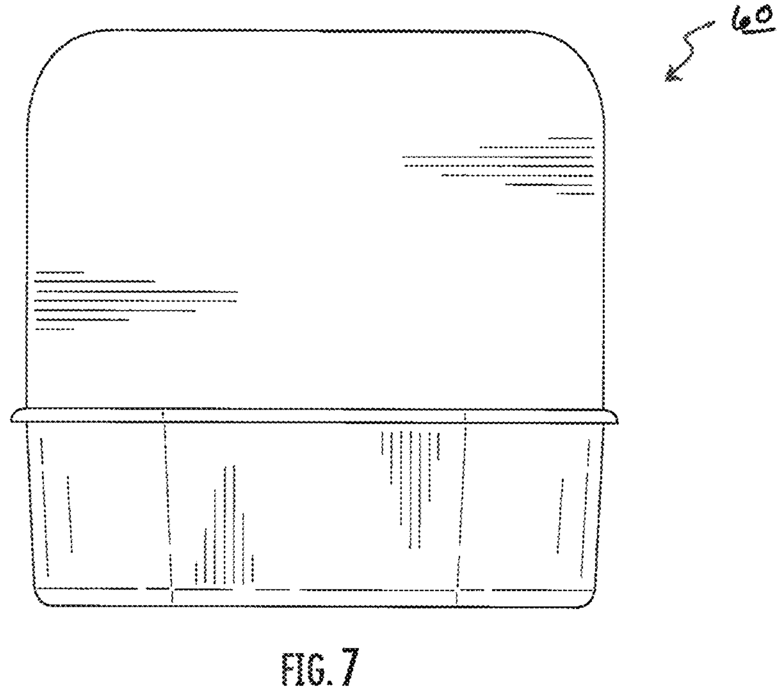
FIG. 7 is an alternative embodiment of a smaller, child sized, bib for use with the present clothing protection system.

FIG. 7 discloses a further embodiment of bib (60) that is specifically sized for a child. It is the same in all material respects to the primary embodiment, however, its dimensions are smaller to account for a smaller user.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A clothing protection system for use by a user in a motor vehicle, the user having a lap and a chest, the clothing protection system comprising in combination:

a vehicle restraint including a lap belt and a shoulder belt, the shoulder belt having a width and an intermediate extent, the lap belt extending over the lap of the user, and the intermediate extent of the shoulder belt extending across the chest of the user;

a bib formed from a pliable silicone-based material, the bib including a panel having a height, a width, forward and rearward faces, and upper and lower extents, the bib further including a receptacle having a depth, a width, and an opened peripheral extent, the receptacle formed upon the forward face and lower extent of the panel, the width of the panel being equal to the width of the receptable, an upstanding edge formed along the opened peripheral extent;

a magnet fully contained within the bib, the magnet being positioned within the rearward face of the panel at the upper extent, the magnet forming a raised area on the rearward face of the panel;

a clip formed from a metallic backing plate and two opposing resilient C-shaped arms, each of the C-shaped arms having a lateral edge that is connected to the backing plate, the C-shaped arms being spaced above the backing plate to form a channel between the backing plate and the two opposing C-shaped arms;

the clip being slidably positioned upon the vehicle restraint by threading the width of the shoulder belt into the channel formed within the clip;

whereby the metallic backing plate of the clip can be magnetically and removably secured to the magnet contained within the bib to thereby slidably position the bib upon the intermediate extent of the shoulder belt.

2. The clothing protection system as described in claim 1 wherein the intermediate extent of the shoulder belt is received within the channel of the clip.

3. The clothing protection system as described in claim 1, wherein the bib is formed entirely from silicone.

* * * * *